March 1, 1955     A. E. RINEER     2,703,186
TUBE CLOSURE
Filed May 5, 1949
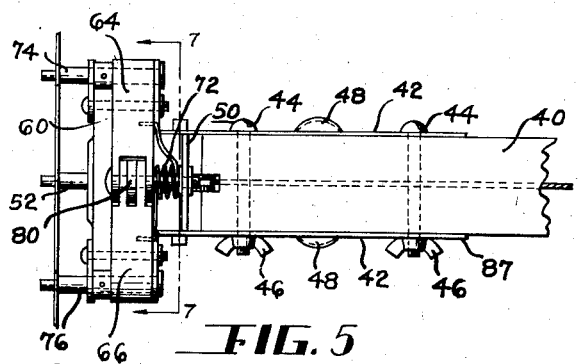
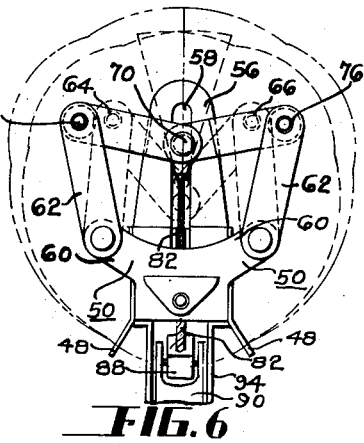
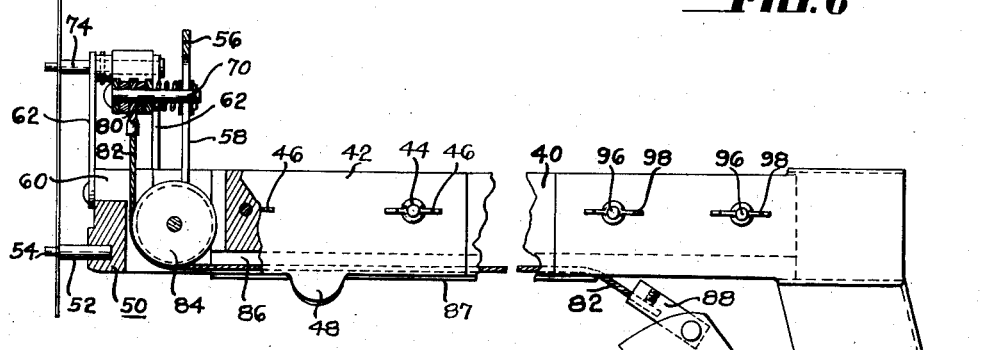
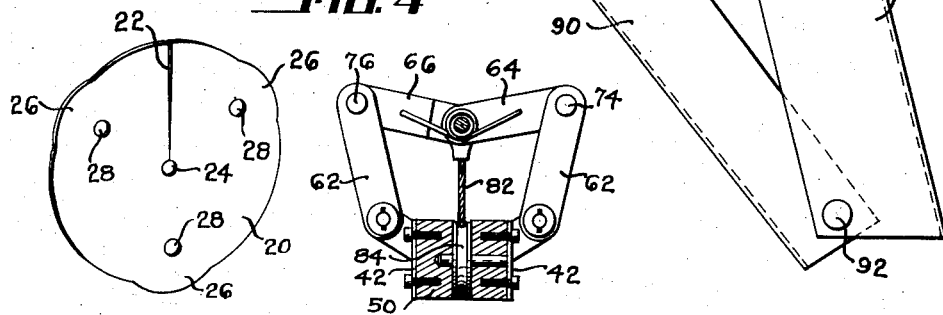
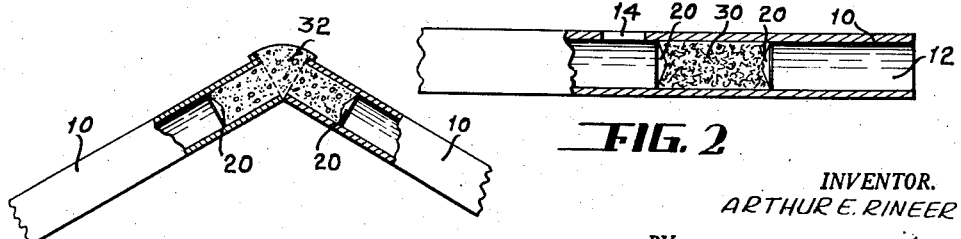
INVENTOR.
ARTHUR E. RINEER
BY
HIS ATTORNEYS United States Patent Office 2,703,186
Patented Mar. 1, 1955

2,703,186

TUBE CLOSURE

Arthur E. Rineer, Centerville, Ohio

Application May 5, 1949, Serial No. 91,568

1 Claim. (Cl. 220—24.5)

This invention relates to a tube blocking device and the apparatus for inserting the same.

An object of this invention is to provide a tube blocking or a tube stopping device that may be located in any desirable position in a tube. The tube blocking or stopping device consists of an expansible disc that is inserted into the tube by a suitable instrument, then released and caused to expand so as to provide a stopper for the tube. For example, in the use of hollow concrete tubes, sometimes referred to in the trade under the trade-name "flexicords," it may be desirable to block the tubular passage in a predetermined position. This has been accomplished by the use of a disc of sheet material, as for example, a sheet iron disc, that is provided with a radial slit or slot extending from the center to the periphery or outer margin, so as to permit the disc to be flexed into a conical contour, thereby reducing the over-all diameter. The disc, when flexed into a conical shape, may be inserted in the tube in the desired location. After the disc is located, it is permitted to straighten itself, to thereby engage the side of the tube to be frictionally held in position.

Another object of this invention is to provide an expansible disc substantially circular in outline with the exception of three ear-like projections that are used as contact points or areas for engaging the wall of the aperture through the tube, so that in the event the aperture is not perfectly round, the disc functioning as a stopper is supported at three points that are preferably equiangularly spaced, so as to provide a firm support for the stopper.

Another object of this invention is to provide a pair of stoppers for a tubular member, which stoppers are used to confine sealing material positioned between the stoppers.

Other objects and advantages reside in the construction of parts, the combination thereof and the mode of operation, as will become more apparent from the following description.

In the drawings,

Figure 1 is a perspective view of a sheet material disc member adapted to be used as a stopper.

Figure 2 is a fragmentary, cross sectional view of a tubular member provided with a pair of stoppers, the disclosure shown in Figure 2 being drawn to a greatly reduced scale from that used in Figure 1.

Figure 3 is another fragmentary, cross sectional view of a pair of tubular members, each provided with a stopper.

Figure 4 is a side elevational view of an instrument for inserting the stopper, shown partly in section and drawn to a larger scale than that used in Figure 1.

Figure 5 is a fragmentary, top plan view of the implement used for inserting the disc.

Figure 6 is a front, end elevational view of the implement used for inserting the disc.

Figure 7 is a cross sectional view, taken substantially on the line 7—7 of Figure 5.

Referring to the drawings, the reference character 10 is used to designate a tube, as for example, a tube made from concrete, having an aperture 12 extending throughout its entire length. This tube has been provided with a laterally disposed opening 14, so that the tube, in addition to functioning as a floor member, may also function as a conduit for hot air. When the tube is used in this manner, it may be desirable to block the tube beyond the aperture or laterally disposed opening 14, so as to limit the air passage to the useful distance. Furthermore, it may be desirable to insulate the opening beyond the usual length of the air passage.

As may readily be seen by referring to Figure 2, the tube has been blocked by a pair of conical members or discs 20, made from sheet metal, from a blank shown in Figure 1. This disc is provided with a radial slot 22 extending from an aperture 24 in the center to the margin of the disc. As is clearly seen in Figure 1, the disc or conical member 20 is provided with three equi-angularly disposed lobes or projections that form contact points for engaging the wall of the aperture, so that if the aperture is not circular but somewhat irregular, the lobes or projections 26 provide points of contact for supporting the disc 20. The disc 20 is provided with three equi-angularly disposed apertures for use in positioning the disc 20, as will appear more fully later.

As may be readily seen from Figure 2, suitable sealing material 30, as for example insulating material such as rock wool, glass fibers, fibrous asbestos, or any other suitable insulating material, is located between the two discs 20, so that the discs 20 function as stoppers and as retaining walls for the sealing material.

In Figure 3 the tubular members have been illustrated as used for a roof. Concrete 32 forms the ridge of the roof. The concrete projects into the tubular members 10 and is confined by a disc 20. These discs 20, due to the resiliency of the material from which they are made, spring outwardly, so as to firmly engage the inner wall of the tube. Furthermore, by pointing the apex of the conical member in the direction in which the force is applied when pouring the concrete or when confining the sealing material, the greater the force applied to the apex or to the concave side of the disc, the greater will be the tendency of the disc to gouge into the wall of the tubular member.

When the disc has once been placed in position, it provides a permanent stopper for the tube. Furthermore, the stopper may be used in connection with other tubes than concrete tubes. For example, it can be used for blocking pipes or any other type of tubular member. The disc is inserted into the tubular member by causing the edges adjacent the slot 22 to overlap, thereby reducing the diameter of the base of the cone, so as to permit the disc to be inserted. Then, by releasing the force used in causing the edges to overlap, the resiliency of the disc will permit the base of the cone to expand to firmly engage the sides of the tubular member, as described above.

An implement for inserting the disc has been provided, which implement will now be described. This implement includes a rod or frame member 40 that may be made of wood or it may consist of a tubular member, as for example, a pipe. The description that follows will be based upon a member made from wood.

A pair of sheet metal attaching stud-like members 42 are secured to one end of member 40 by means of bolts 44 and wing nuts 46. Each of the members 42 may be provided with downwardly and outwardly flaring ear-like portions 48, which function as guides resting upon the wall of the tubular member receiving the conical member or disc 20. A head member 50 is attached to the forward end of members 42 and supports a forwardly directed pin 52 provided with a reduced end 54. Member 50 also has fixedly attached thereto a standard 56, provided with a vertically disposed groove or slot 58.

The head member 50 is provided with a pair of laterally disposed extensions 60, each pivotally supporting a pair of links 62. One pair of links 62 supports a link member 64. The other pair of links 62 supports a link member 66. The link members 64 and 66 are pivotally attached at the center by means of a pin or stud 70, as clearly seen in Figures 4, 5 and 6. The pin or stud 70 has one end projecting through the slot 58. A torsion spring 72 surrounds the pin 70 and is positioned between the center of the link member 64 and a suitable washer engaging the standard 56. The ends of the spring 72 are located or seated in suitable apertures in the sides of link members 64 and 66. The torsion of the spring 72 is such that it tends to cause the link members 64 and 66 to rotate in a counterclockwise and clockwise direction respectively, about the pins 74 and 76, as viewed in Figure 6, thereby urging the link members 64 and 66 upwardly towards the top of the slot 58. The pins 74 and 76 terminate in reduced projections, as best seen in Figures 4 and 5. An eye or link 80 is mounted on the pin 70 and is connected to a cable 82 passing over a pulley 84 seated in the center of the head member 50 and passing through a groove or slot 86 in the under side of member 40. A metal plate 87 is used in covering the slot 86. The other end of the cable 82 is connected to a lug 88 pivotally attached to a trigger 90 having its lower end pivoted at 92 to a handle 94 secured to the other end of member 40 by bolts 96 and wing nuts 98. By actuating the trigger member 96 so as to exert a pull upon the cable 82, the center of the links 64 and 66 will be actuated downwardly into the dot-dash position shown in Figure 6, so as to cause the pins 74 and 76 to move towards each other, in other words, shorten the distance between the pins 74 and 76.

As may be clearly seen in Figure 1, the disc 20 is provided with three equi-angularly disposed apertures 28, equally spaced from the center hole 24. By inserting member 20 so as to project the ends of the pins 54, 74 and 76 into the holes in member 20 with the slot 22 being located between the pins 74 and 76, it can readily be seen that by tensioning the cable 82 so as to pull the center of the links 64 and 66 downwardly, as viewed in Figure 6, the margins adjacent the slot 22 will overlap, as clearly shown in Figure 6, so as to cause the disc 20 to be formed into a conical contour. The diameter of the base of the conical member is considerably less than the diameter of the disc 20 when in a flat position. By holding the trigger 90 so as to hold the pins 74 and 76 in the dotted position shown in Figure 6, it can readily be seen that the implement may be used in positioning the disc in the opening in the tubular member. Then, by releasing the trigger 90, the torsion spring will permit the links 64 and 66 to rise into a horizontal position, permitting the disc or conical member to exand until the lobes 26 engage the wall of the aperture, at which time the implement may be removed, the disc remaining in position plugging the hole in the tubular member.

The desirable length of the rod 40 may differ for different installations. That being the case, the implement is preferably provided with a plurality of rods of various lengths, the rod of a desired length being used. It is merely necessary to unscrew the wing nuts 46 and 98 and remove the bolts 44 and 96 to permit the interchange of rods. At the same time it will be necessary to either substitute a new cable or add to the length of the cable or to use the same cable but connect member 88 to the cable at such a position that the useful length of the cable is compatible to the length of the selected rod.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

In combination, a hollow concrete tube having an irregular surface therein, concrete positioned at a predetermined distance in said tube, means for blocking the tube at the predetermined position, said means comprising an expansible disc having openings therein to enable the disc to be inserted at a desired position in the tube, said disc having a radial slot therein, said openings and slot cooperating to enable the disc to be flexed into a conical shape thereby reducing the overall diameter so as to permit the disc to be inserted in the tube at the desired location, three equally spaced protuberances extending radially outwardly from the periphery of the disc so as to form lobes thereon, said lobes forming contact points frictionally engaging the wall of the tube and for centering said disc regardless of said irregular shape, the apex of the conical shaped disc being positioned in the tube so as to be contiguous to the concrete, forces exerted by the concrete on the disc tending to expand said disc so as to secure it in the hollow concrete tube.

References Cited in the file of this patent

UNITED STATES PATENTS

| Number | Name | Date |
|---|---|---|
| 843,855 | Weller | Feb. 12, 1907 |
| 1,187,186 | Seys | June 13, 1916 |
| 1,534,184 | Marchesini et al. | Apr. 21, 1925 |
| 1,822,138 | Fricke | Sept. 8, 1931 |
| 1,837,346 | Thomas et al. | Dec. 22, 1931 |
| 2,064,042 | Von Till | Dec. 15, 1936 |
| 2,256,775 | Hubbell | Sept. 23, 1941 |
| 2,288,731 | Newlon | July 7, 1942 |
| 2,341,063 | Tinnerman | Feb. 8, 1944 |
| 2,401,856 | Brock | June 11, 1946 |
| 2,470,891 | Hammers | May 24, 1949 |
| 2,529,424 | Seigh | Nov. 7, 1950 |
| 2,533,159 | Yates | Dec. 5, 1950 |

FOREIGN PATENTS

| Number | Country | Date |
|---|---|---|
| 850,957 | France | Sept 25, 1939 |